United States Patent

Ruschig et al.

[15] 3,681,458
[45] Aug. 1, 1972

[54] 3-ACYL-γ-RESORCYLIC ACID ANILIDES

[72] Inventors: Ruschig, Heinrich, Bad Soden/Taunus; Düwel, Dieter, Hofheim/Taunus; König, Johann, Niederhofheim/Taunus; Loewe, Heinz, Kelkheim/Taunus, Germany

[73] Assignee: Farbwerke Hoechst Aktiengesellscahft Vormals Meister Lucius & Bruning, Frankfurt/Main, Germany

[22] Filed: Sept. 1, 1970

[21] Appl. No.: 68,775

[30] Foreign Application Priority Data

Sept. 16, 1969 Germany............P 19 46 751.7

[52] U.S. Cl. ................260/559 S, 424/324, 260/480
[51] Int. Cl.....................C07c 103/38, C07c 103/30
[58] Field of Search......................260/559

[56] References Cited

OTHER PUBLICATIONS

R. Hassell et al., J. Chem. Soc. (London) (C) 1967, pp. 912–914.

*Primary Examiner*—Henry R. Jiles
*Assistant Examiner*—Harry I. Moatz
*Attorney*—Curtis, Morris & Safford

[57] ABSTRACT

Anthelmintically active 3-acyl-γ-resorcylic acid anilides of the formula

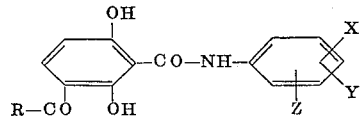

in which R is linear or branched alkyl having one to six carbon atoms, X is hydrogen, halogen, nitro or trifluoromethyl, and Y and Z, which are the same or different, are hydrogen, methyl, trifluoromethyl, methoxy or halogen, as well as a process for their preparation.

4 Claims, No Drawings

3-ACYL-γ-RESORCYLIC ACID ANILIDES

The present invention relates to anthelmintically active 3-acyl-γ-resorcylic acid anilides of the general formula

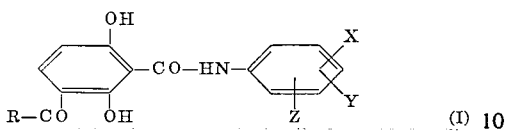

in which R is linear or branched alkyl having one to six carbon atoms, X is hydrogen, halogen, nitro or trifluoromethyl, and Y and Z, which are the same or different, are hydrogen, methyl, trifluoromethyl, methoxy or halogen.

The invention moreover relates to a process for the manufacture of the above-mentioned compounds which comprises reacting γ-resorcylic acid anilides of the formula

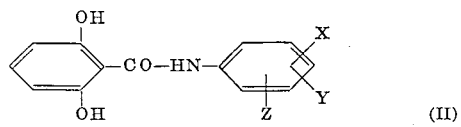

in which X, Y and Z have the meanings given above, with acids or acid derivatives in the presence of Lewis acids according to the Friedel-Crafts reaction and, optionally, hydrolyzing the esters which may be formed as intermediates.

According to this process a variety of γ-resorcylic acid anilides, for example 2,6-dihydroxy-benzoic acid-3'-trifluoromethyl anilide, 2,6-dihydroxy-benzoic acid-4'-chloroanilide, 2,6-dihydroxy-benzoic acid-4'-bromo-anilide, 2,6-dihydroxy-benzoic acid-3',5'-bis-trifluoromethyl-anilide or 2,6-dihydroxy-benzoic acid-4'-iodo-anilide, may be subjected to a Friedel-Crafts reaction.

As acid derivatives preferably acid halides are used. Suitable acyl halides are, for example, acetyl chloride, propionyl chloride, butyryl chloride, isobutyryl chloride, valeroyl chloride and caproyl chloride. Free carboxylic acids may also be used in the presence of a water-binding agent, such as polyphosphoric acid.

The solvents used are those that are usually employed in Friedel-Crafts reactions, for example sulfolane, tetrachloroethane, carbon sulfide, nitrobenzene and acetic anhydride. In the latter case, the phenolic hydroxy groups are first esterified, but in the further course of the reaction a displacement of the acyl groups from the hydroxy groups to the benzene nucleus takes place (Fries' displacement; see Example 16).

The reaction is preferably carried out at an elevated temperature in the presence of a Lewis acid, such as $AlCl_3$, $BF_3$ or $SnCl_4$, generally within a period of at least 1 hour. When $AlCl_3$ or $BF_3$-etherate are used, complex compounds are formed which have to be destroyed by means of a mineral acid.

The starting materials of the formula II may be obtained in known manner, for example by reacting functional derivatives of, for example, γ-resorcylic acid with (X,Y,Z)-substituted anilines.

The novel 3-acyl-γ-resorcylic acid anilides have a notable anthelmintic activity, in particular against the liver fluke, especially against Fasciola hepatica. The anthelmintic effect is demonstrated on rats and rabbits as test animals. In practice, the infestation especially of sheep with the liver fluke has a considerable economic importance and the products of the invention have proved to be excellent chemotherapeutical compounds in the treatment of this helmintic disease. The products can be administered orally or subcutaneously; depending on the individual case one or the other of the administration methods may be more suitable.

The following table indicates for some products of the invention the dosage units which, after a single administration to normally infested sheep, were capable of entirely stopping the secretion of liver fluke eggs and completely freeing the animals from liver flukes.

Table: Chemotherapeutical investigations
host animal: sheep
parasite: Fasciola hepatica

| Substance | mode of administration | therapeutical dosage (mg/kg of body weight) |
| --- | --- | --- |
| 3-butryl-γ-resorcylic acid-3', 5'-bis-trifluoromethyl anilide | per os | 10 |
| 3-isobutyryl-γ-resorcylic acid-3', 5'-bis-trifluoromethyl anilide | per os | 10 |
| 5-iodo-3-isobutyryl-γ-resorcylic acid-3',5'-bis-trifluoromethyl anilide | per os | 15 |

The indicated dosages were tolerated by the animals without any side effect. The products of the invention are therefore valuable medicaments for the treatment of liver fluke infestations in mammals.

The following examples serve to illustrate the invention:

EXAMPLE 1:

3-Isobutyryl-2,6-dihydroxy-benzoic acid-3'-trifluoromethyl anilide.

A mixture of 40 g of 2,6-dihydroxy-benzoic acid-3'-trifluoromethyl anilide (m.p. 209° C), 105 ml of sulfolane, 47 g of isobutyric acid chloride and 35 ml of boron trifluoride-etherate was heated at 100° C for 3 hours. After cooling, the contents of the flask were poured onto 500 g of ice and the precipitated crystals were suction-filtered and washed with 50 ml of water. The crude product was refluxed for 1 hour in a mixture of 75 ml of dioxane, 150 ml of methanol and 20 ml of concentrated hydrochloric acid and the solution obtained was evaporated in vacuo until crystallization began. After cooling, the crystals were suction-filtered and washed with 50 ml of methanol. 37 g of 3-isobutyryl-2,6-dihydroxy-benzoic acid-3'-trifluoromethyl anilide were obtained, m.p. 123°–125° C. In the same manner the following compounds were obtained with the same good yield:

EXAMPLE:

| | | m.p. |
| --- | --- | --- |
| 2 | 3-Isobutyryl-2,6-dihydroxy-benzoic acid-4'-chloro-anilide. | 171–173°C |
| 3 | 3-Isobutyryl-2,6-dihydroxy-benzoic acid-4'-bromo-anilide. | 181–182°C |
| 4 | 3-Isobutyryl-2,6-dihydroxy-benzoic acid-3',5'-bis-trifluoromethyl anilide. | 131–132°C |
| 5 | 3-Isobutyryl-2,6-dihydroxy-benzoic acid-4'-iodo-anilide. | 167–169°C |

EXAMPLE 6:

3-Caproyl-2,6-dihydroxy-benzoic acid-3',5'-bis-trifluoromethyl anilide.

A mixture of 73 g of 2,6-dihydroxy-benzoic acid-3',5'218°–220°C), 310 ml of tetrachloroethane, 92 g of caproyl chloride and 50 ml of boron trifluoride-etherate was heated at 100° C for 4 hours. Tetrachloroethane was then distilled off in vacuo. The solid residue was triturated with 200 ml of petroleum ether, suction-filtered and washed with 100 ml of petroleum ether. The boron trifluoride complex compound thus isolated was decomposed by refluxing it for 3 hours with a mixture of 120 ml of dioxane, 240 ml of methanol and 30 ml of concentrated hydrochloric acid. After cooling, the crystals that had formed were suction-filtered and washed with 150 ml of methanol. 76 g of 3-caproyl-2,6-dihydroxy-benzoic acid-3',5'-bis-trifluoromethyl anilide were obtained, m.p. 136°–137° C.

In the same manner as above the following compounds were obtained with the same good yield:

EXAMPLE:

| | | m.p. |
|---|---|---|
| 7 | 3-Butyryl-2,6-dihydroxy-benzoic acid anilide | 125–126°C |
| 8 | 3-Butyryl-2,6-dihydroxy-benzoic acid-4'-chloro-anilide | 129–131°C |
| 9 | 3-Butyryl-2,6-dihydroxy-benzoic acid-2',4'-dichloro-anilide | 178–180°C |
| 10 | 3-Butyryl-2,6-dihydroxy-benzoic acid-3',5'-bis-trifluoromethyl anilide | 109–111°C |
| 11 | 3-Isobutyryl-2,6-dihydroxy-benzoic acid-4'-bromo-anilide | 181°C |
| 12 | 3-Butyryl-2,6-dihydroxy-benzoic acid-4'-bromo-anilide | 128–130°C |
| 13 | 3-Caproyl-2,6-dihydroxy-benzoic acid-4'-bromo-anilide | 103–105°C |

EXAMPLE 14:

3-Acetyl-2,6-dihydroxy-benzoic acid-4'-bromo-anilide

A mixture of 62 g of 2,6-dihydroxy-benzoic acid-4'-bromoanilide, 200 ml of tetrachloroethane, 40 ml of acetic anhydride and 50 ml of boron trifluoride-etherate was heated at 95° C for 2 hours. During the reaction a crystallized boron trifluoride complex of the final compound precipitated. It was suction-filtered, washed with 120 ml of carbon tetrachloride and decomposed by refluxing it for 2 hours with a mixture of 150 ml of dioxane, 300 ml of methanol and 30 ml of concentrated hydrochloric acid. After cooling, the crystals were suction-filtered and washed with 80 ml of methanol. 43 g of 3-acetyl-2,6-dihydroxy-benzoic acid-4'-bromo-anilide were obtained; m.p. 171°–173° C.

EXAMPLE 15:

In the same manner as in Example 14, 3-acetyl-2,6-dihydroxy-benzoic acid-3',5'-bis-trifluoromethyl anilide was obtained; m.p. 151°–153°C.

EXAMPLE 16:

3-Acetyl-2,6-dihydroxy-benzoic acid-4'-bromo-anilide a. A mixture of 61 g of 2,6-dihydroxy-benzoic acid-4'-bromo-anilide, 70 ml of acetic anhydride and 10 ml of acetyl chloride was heated at 100° C for 90 minutes. The solution obtained was evaporated in vacuo and the solid residue was recrystallized three times from benzene. 52 g of 2,6-dihydroxy-benzoic acid-4'-bromo-anilide were obtained; m.p. 142° C.

b. 39 g of 2,6-diacetoxy-benzoic acid-4'-bromo-anilide, 27 g of anhydrous aluminum chloride and 150 ml of tetrachloroethane were heated together to a bath temperature of 160° C for 3 hours. The solution was then cooled, 300 g of ice were added and tetrachloroethane was evaporated by means of steam. The undissolved residue was suction-filtered, washed with 200 ml of water, heated to 80° C for 30 minutes with 200 ml of 18 percent hydrochloric acid, suction-filtered again after cooling, washed with 75 ml of water and recrystallized from dioxane. 23 g of 3-acetyl-2,6-dihydroxy-benzoic acid-4'-bromo-anilide were obtained; m.p. 171°–173° C.

EXAMPLE 17:

3-Acetyl-2,6-dihydroxy-benzoic acid-3',5'-bis-trifluoromethyl anilide a. According to Example 16 (a), 2,6-diacetoxy-benzoic acid-3',5'-bis-trifluoromethyl anilide, m.p. 147°–148° C, was prepared from 2,6-dihydroxy-benzoic acid-3',5'-bis-trifluoromethyl anilide (m.p. 218°–220° C).

b. 22 g of 2,6-diacetoxy-benzoic acid-3',5'-bis-trifluoromethyl anilide, 75 ml of tetrachloroethane and 15 ml of boron trifluoride etherate were heated together to 95° C for 4 hours. The contents of the flask were then carefully evaporated in vacuo and the residue was refluxed for 90 minutes with a mixture of 60 ml of dioxane, 120 ml of methanol and 15 ml of concentrated hydrochloric acid. After cooling, the crystals were suction-filtered and washed with 30 ml of methanol. 16 g of 3-acetyl-2,6-dihydroxy-benzoic acid-3',5' 151°–153° C.

EXAMPLE 18:

3-Isobutyryl-2,6-dihydroxy-benzoic acid-3',5'-bis-trifluoromethyl anilide.

36 g of 2,6-dihydroxy-benzoic acid-3',5'-bis-trifluoromethyl anilide, 140 g of polyphosphoric acid and 150 ml of sulfolane were stirred at 70° C until a smooth paste was obtained, to which 10 g of isobutyric acid were then added. The mixture was heated at 95° C for 3 hours, then cooled to about 35° C. 400 g of ice were added and the whole was stirred again for 1 hour at room temperature. The crude product was suction-filtered, washed with 150 ml of water and recrystallized twice from dioxane. 18 g of 3-isobutyryl-2,6-dihydroxy-benzoic acid-3',5'-bis-trifluoromethyl anilide were obtained; m.p. 131° C.

EXAMPLE 19:

3-Acetyl-2,6-dihydroxy-benzoic acid-4'-bromo-anilide

To a solution of 9.3 g of 2,6-dihydroxy-benzoic acid-4'-bromo-anilide in 25 ml of sulfolane, 10 ml of tin tetrachloride and 5.0 g of acetic anhydride were added successively while stirring and cooling. The solution was then heated at 95° C for 75 minutes and allowed to stand for 18 hours at room temperature. The contents of the flask were then poured into 80 ml of 2N hydrochloric acid. The precipitate formed was suction-filtered, washed with 30 ml of water and recrystallized twice from dioxane. 6.7 g of 3-acetyl-2,6-dihydroxy-benzoic acid-4'-bromo-anilide were obtained; m.p. 171°–172° C.

We claim:

1. A 3-acyl-γ-resorcylic acid anilide of the formula

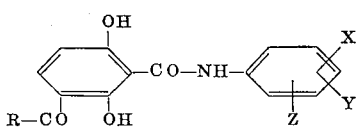

in which R is linear or branched alkyl having one to six carbon atoms, X is hydrogen, halogen, nitro or trifluoromethyl, and Y and Z, which are the same or different, are hydrogen, methyl, trifluoromethyl, methoxy or halogen.

2. 3-Butyryl-γ-resorcylic acid-3',5'-bis-trifluoromethyl anilide.

3. 3-Isobutyryl-γ-resorcylic acid-3',5'-bis-trifluoromethyl anilide.

4. 5-Iodo-3-isobutyryl-γ-resorcylic acid-3',5'-bis-trifluoromethyl anilide.

* * * * *